United States Patent
Norihisa

(10) Patent No.: US 8,504,307 B2
(45) Date of Patent: Aug. 6, 2013

(54) MACHINE DIAGNOSING METHOD AND DEVICE THEREFOR

(75) Inventor: Takashi Norihisa, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 525 days.

(21) Appl. No.: 12/323,635

(22) Filed: Nov. 26, 2008

(65) Prior Publication Data

US 2009/0171594 A1 Jul. 2, 2009

(30) Foreign Application Priority Data

Dec. 27, 2007 (JP) ................................. 2007-337601

(51) Int. Cl.
*G01B 3/44* (2006.01)

(52) U.S. Cl.
USPC .............. 702/34; 702/33; 702/35; 702/41; 702/42; 702/43; 702/45; 702/158; 702/161; 702/193

(58) Field of Classification Search
USPC .............. 702/34, 33, 35, 41, 42, 43, 45, 158, 702/161, 193
See application file for complete search history.

(56) References Cited

U.S. PATENT DOCUMENTS 6,633,104 B1 * 10/2003 Hershey et al. ............... 310/242
2003/0121717 A1 * 7/2003 Tokumoto ..................... 180/446

FOREIGN PATENT DOCUMENTS

JP 2000-237908 A1 9/2000
JP 2002-157018 A1 5/2002

OTHER PUBLICATIONS

Drouet et al., "Compensation of geometric and elastic deflection errors in large manipulators based on experimental measurements: application to a high accuracy medical manipulator," (1998).*
Drouet et al., Compensation of geometric and elastic deflection errors in large manipulators based on experimental measurement: application to a high accuracy medical manipulator (1998).*

* cited by examiner

*Primary Examiner* — Jonathan C Teixeira Moffat
*Assistant Examiner* — Hyun Park
(74) *Attorney, Agent, or Firm* — Burr & Brown

(57) ABSTRACT

A machine diagnosing device includes a drive object driving force estimating unit for estimating drive object driving force based on a torque command value toward a servo motor which is acquired using a position command value, an elastic deformation error estimating unit for estimating an elastic deformation error of a ball screw with the drive object driving force, and a positional deviation calculating unit for calculating a positional deviation using a rotation position of the servo motor and the position of a table, and a machine damage diagnosing unit for diagnosing a machine damage by calculating a machine damage coefficient using the elastic deformation error and the positional deviation, comparing the obtained machine damage coefficient with a previously set threshold value, and diagnosing a damage state of the drive object.

12 Claims, 7 Drawing Sheets

MACHINE DIAGNOSING METHOD AND DEVICE THEREFOR

CROSS-REFERENCE TO RELATED APPLICATION

This application claims the benefit of Japanese Patent Application Number 2007-337601 filed on Dec. 27, 2007, the entirety of which is incorporated by reference.

FIELD OF THE INVENTION

The present invention relates to a machine diagnosing method for diagnosing a damage state such as an abrasion of a part or an increase of operation resistance in a machine tool and an industrial machine, and also relates to a device therefor.

BACKGROUND OF THE INVENTION

For example, in a machine tool, a full closed loop position control device is used for positioning a table or the like to be driven with high accuracy. As described in Patent document 1, the full closed loop position control device includes a first position detector for detecting a rotation position of a motor and a second position detector for directly detecting a position of a drive object driven by the motor. The full closed loop position control device controls a position of a drive object based on an inputted position command value, a rotation position of the motor which is detected by the first position detector, and the position of the drive object which is detected by the second position detector.

On the other hand, in a machining line used in a mass-production, stopping of machine working causes stopping of the whole line. Moreover, sudden stop becomes a problem causing a delay in a delivery time of parts. Therefore, if abnormality or duration of life of each unit of a machine tool can be detected in advance, it is possible to take countermeasure such as replacing the part while a line is not in operation. Thus, a diagnostic function of a damage state is desired in a machine tool. A conventional full closed loop position control machine does not have a function for diagnosing a damage state of a drive object although the positioning accuracy is intended to be improved.

For example, as described in Patent document 2, diagnosing an abnormality detection of a feed spindle can be conducted by attaching a function for determining whether a motor torque exceeds a set threshold value.

Patent document 1: Japanese Unexamined Patent Publication No. 2002-157018
Patent document 2: Japanese Unexamined Patent Publication No. 2000-237908

SUMMARY OF THE INVENTION

If duration of life and abnormality of details in each unit of a machine tool can be diagnosed, a maintenance time can be shortened. However, in the abnormality detection in Patent document 2, the existence of abnormality in a feed spindle is determined by only a value of a motor torque, and thus reliability of diagnosing is not high. Further, when an external force such as a machining force is inputted, abnormality cannot be diagnosed, and an abnormal part is hardly specified.

An objective of the present invention is to provide a machine diagnosing method capable of diagnosing a damage state with high accuracy in a full closed loop position control machine, and also provide a device therefor.

A first aspect of the invention to realize the afore-said objective is a machine diagnosing method for diagnosing a machine damage in a full closed loop position control machine, and the method includes a drive object driving force estimating step for estimating a drive object driving force based on at least a torque command value toward a motor which is acquired using a position command value, an elastic deformation error estimating step for estimating an elastic deformation error of a drive object with the drive object driving force, a positional deviation calculating step for calculating a positional deviation between a rotation position of a motor and a position of a drive object, and a machine damage diagnosing step for diagnosing a damage state of a drive object by calculating a machine damage coefficient using the elastic deformation error and the positional deviation, and comparing the obtained machine damage coefficient with a previously set threshold value.

A second aspect of the invention to realize the afore-said objective is a machine diagnosing device for diagnosing a machine damage in a full closed loop position control machine, and the device includes a drive object driving force estimating unit for estimating a drive object driving force based on at least a torque command value toward the motor which is acquired using a position command value, an elastic deformation error estimating unit for estimating an elastic deformation error of a drive object with the drive object driving force, a positional deviation calculating unit for calculating a positional deviation between a rotation position of the motor and a position of the drive object, and a machine damage diagnosing unit for diagnosing a machine damage state of the drive object by calculating a machine damage coefficient using an elastic deformation error and a positional deviation, comparing the obtained machine damage coefficient with a previously set threshold value.

A third aspect of the invention to realize the afore-said objective is a machine diagnosing method for diagnosing a machine damage in the full closed loop position control machine, and the method includes a drive object driving force estimating step for estimating a drive object driving force based on at least a torque command value toward the motor which is acquired using a position command value, a positional deviation calculating step for calculating a positional deviation between a rotation position of the motor and a position of the drive object, and a machine damage diagnosing step for diagnosing a damage state of the drive object by calculating a machine damage coefficient based on the drive object driving force and the positional deviation, and comparing the obtained machine damage coefficient with a previously set threshold value.

A fourth aspect of the invention to realize the afore-said objective is a machine diagnosing device for diagnosing a machine damage in the full closed loop position control machine, and the device includes a drive object driving force estimating unit for estimating a drive object driving force based on at least a torque command value toward the motor which is acquired using a position command value, a positional deviation calculating unit for calculating a positional deviation between the rotation position of a motor and the position of the drive object, a machine information storing unit for storing the drive object driving force and the positional deviation, a damage coefficient calculating unit for calculating the machine damage coefficient based on the drive object driving force stored in the machine information storing unit and the positional deviation, and a machine damage diagnosing unit for diagnosing a machine damage state of the drive object by comparing the machine damage coefficient obtained by the damage coefficient calculating unit with a previously set threshold value.

A fifth aspect of the invention is a following machine diagnosing device in the configuration of the fourth aspect. That is, in order to acquire proper machine information and to enable to perform a diagnosis more precisely, when predetermined machine information at a time of reversing in a driving direction of the motor or the driving object does not satisfy a predetermined condition, the machine information storing unit does not conduct storing processing of the machine information or the damage coefficient calculating unit removes the machine information from an calculate object.

A sixth aspect of the invention is a following machine diagnosing device in the configurations of the fourth or fifth aspects. That is, in order to calculate the machine damage coefficient more accurately, the machine information storing unit stores a plurality of drive object driving forces and positional deviations in a time-series manner. The damage coefficient calculating unit approximates a correlation between the plurality of drive object driving forces and positional deviations to a line to acquire an inclination of the line, and calculates the machine damage coefficient using the acquired inclination and a previously set inclination at a normal time.

A seventh aspect of the invention is the following machine diagnosing device in any one of the configurations of the fourth to sixth aspects. That is, in order to improve a reliability of a machine diagnosis, the damage coefficient calculating unit calculates a second machine damage coefficient using the drive object driving force and a previously set guide resistance upper limit of a guide part of the drive object. When the machine damage diagnosing unit does not diagnose abnormality by comparing the machine damage coefficient and the threshold value, it compares the second machine damage coefficient with a previously set threshold value to diagnose a damage state of the drive object.

An eighth aspect of the invention is a following machine diagnosing device in the configuration of the seventh aspect. That is, in order to properly diagnose a sign of an abnormality, the second machine damage coefficient is made to be a probability in which a ratio of the drive object driving force and a guide resistant upper limit does not satisfy a previously set condition.

A ninth aspect of the invention is a following machine diagnosing device in any one of the constitutions of the fourth to eighth aspects. That is, in order to enable to specify an abnormal part and to make treatment after diagnosis easy, the machine damage diagnosing unit sets a lower limit and an upper limit as a threshold value of the machine damage coefficient, and diagnoses abnormality when the machine damage coefficient is not within the range from the lower limit to the upper limit.

According to the inventions of the first to the fourth aspects, the machine diagnosing method enables to diagnose a damage state with much higher reliability than that of a conventional method by rationally using the first and second position detectors included in the full closed loop position control machine. Therefore, the machine can detect an abnormal part or duration of life in advance and enables to notify it to a user.

According to the invention of the fifth aspect, a following effect can be acquired in addition to an effect of the invention of the fourth aspect. That is, proper machine information can be acquired to calculate a machine damage coefficient with high accuracy, and thus a precise machine diagnosis can be performed.

According to the invention of the sixth aspect, a following effect can be acquired in addition to the effects of the inventions of the fourth or fifth aspects. That is, a machine damage coefficient can be calculated more precisely based on a plurality of drive object driving forces and positional deviations.

According to the invention of the seventh aspect, a following effect can be acquired in addition to the effect of any one of the inventions of the fourth to sixth aspects. That is, since a second damage coefficient is applied, the abnormality of the guide unit can be diagnosed, and thus the reliability of a machine diagnosis can be improved.

According to the invention of the eighth aspect, the following effect can be acquired in addition to the effect of the invention of the seventh aspect. That is, a sign of abnormality can be spotted by an increase of the probability, and thus a diagnosis can be performed before a serious trouble occurs.

According to the invention of the ninth aspect, the following effect can be acquired in addition to the effect of any one of the inventions of the fourth to eighth aspects. That is, an abnormal part can be specified with the diagnosis, and thus treatment of the part such as maintenance or the like can be performed easily.

DETAILED DESCRIPTION OF THE INVENTION

Figure 1:
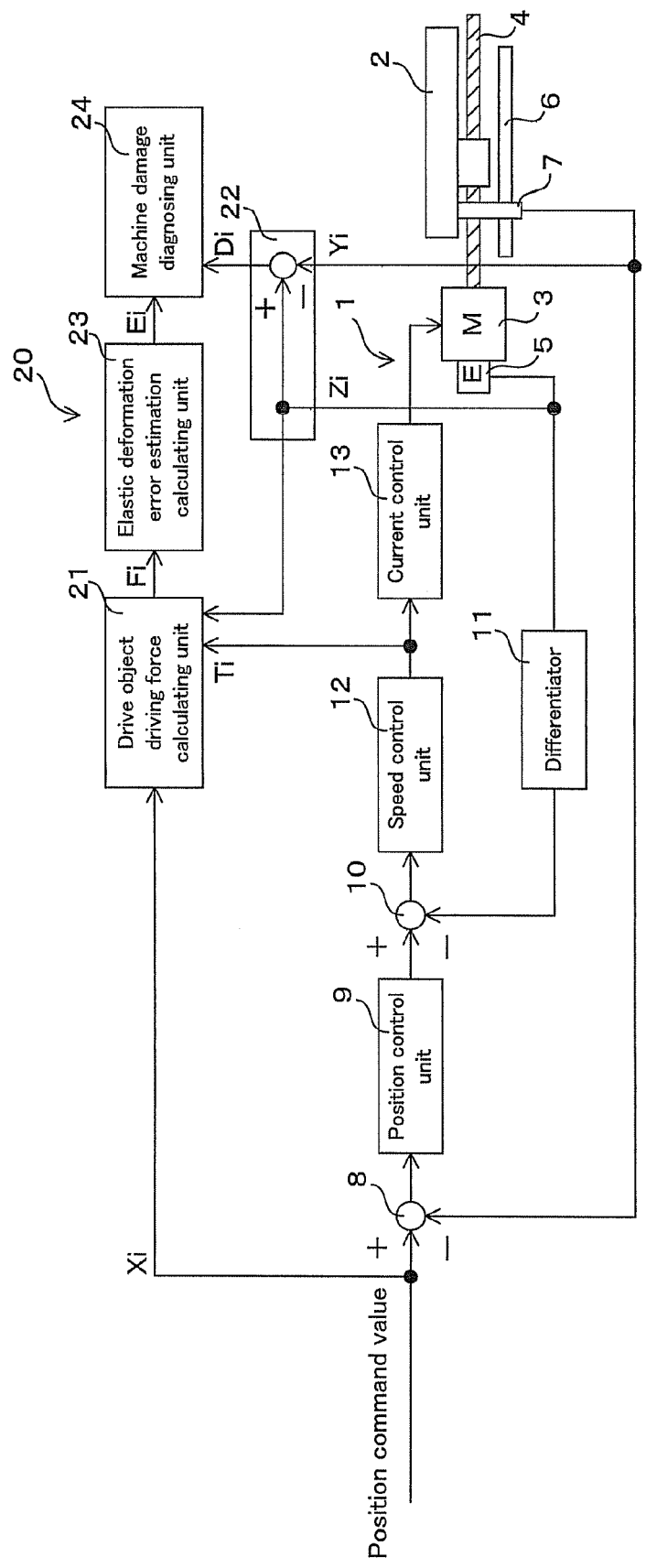
FIG. 1 is a constitutional block diagram of a machine diagnosing device of a first embodiment.

Preferred embodiments of the present invention will be described referring to the drawings.

Embodiment 1

FIG. 1 is a constitutional block diagram illustrating one example of a machine diagnosing device used for a machine tool, and the device is provided in a position control device of a table. First of all, a position control device 1 of a machine tool has a table 2 as a drive object which is slidably provided with a ball screw 4 rotated by driving a servo motor 3. The servo motor 3 has a first position detector 5 for detecting a rotation position of the table 2. The table 2 has a second position detector 7 which is slidably attached along a scale 6 parallel to the ball screw 4 and can detect the sliding position of the table 2.

Further, a position command value is inputted from a NC device (not illustrated) to the position control device 1, and a subtractor 8 subtracts the position detected value (a sliding position signal of the table 2) acquired by the second position detector 7 using the position command value, and calculates a positional deviation. A position control unit 9 outputs a speed command value based on the positional deviation. At an inner side of a position loop, a speed command value is inputted into a subtractor 10. The subtractor 10 subtracts a differential value (a rotation speed of the servo motor 3), which is acquired by differentiating the rotation position signal acquired with the first position detector 5 by a differentiator 11, from the speed command value and calculates a speed deviation. In the speed loop, a speed control unit 12 outputs a motor torque command value based on the speed deviation. The motor torque command value is amplified by a current control unit 13 and outputted to the servo motor 3.

A machine diagnosing device 20 is for diagnosing a damage state in the position control device 1 of the full closed loop. In this embodiment, the machine diagnosing device 20 includes a drive object driving force calculating unit 21, a positional deviation calculating unit 22, an elastic deformation error estimation calculating unit 23, and a machine damage diagnosing unit 24.

The drive object driving force calculating unit 21 is respectively inputted with a position command value Xi from the NC device, a motor torque command value Ti by the speed control unit 12, and a rotation position Zi of the servo motor 3 acquired by the first position detector 5. Then, the drive object driving force calculating unit 21 calculates a drive object driving force (a force acting on the ball screw 4 to be an elastic body) based on a routine described below. Further, the elastic deformation error estimation calculating unit 23 calculates an elastic deformation error Ei by the formula of Fi/K, where Fi is the drive object driving force which is inputted by the drive object driving force calculating unit 21, and K is a spring constant of the ball screw 4. Further, the positional deviation calculating unit 22 acquires a positional deviation Di by calculating a difference between a rotation position Zi of the servo motor 3 and a position Yi of the table 2 acquired by the second position detector 7.

The positional deviation Di which is a difference between the rotation position Zi of the servo motor 3 and the position Yi of the table 2 is an elastic deformation amount of the ball screw 4, and is proportional to a force acting on an elastic body, that is, the drive object driving force Fi. Thus, this embodiment estimates the elastic deformation error Ei using the estimated drive object driving force Fi and the previously set spring constant K.

The machine damage diagnosing unit 24 calculates a machine damage coefficient $\eta$ using the elastic deformation error Ei calculated by the elastic deformation error estimation calculating unit 23 and the positional deviation Di which is an actually measured elastic deformation amount calculated by the positional deviation calculating unit 22. Then, the machine damage diagnosing unit 24 compares the machine damage coefficient $\eta$ with a previously set threshold value $\eta 0$ so as to diagnose the damage state of the machine. For example, this machine damage coefficient $\eta$ is calculated by the formula of $\eta = Ei-Di$ or $\eta = (Ei-Di)/Di$.

Figure 2:
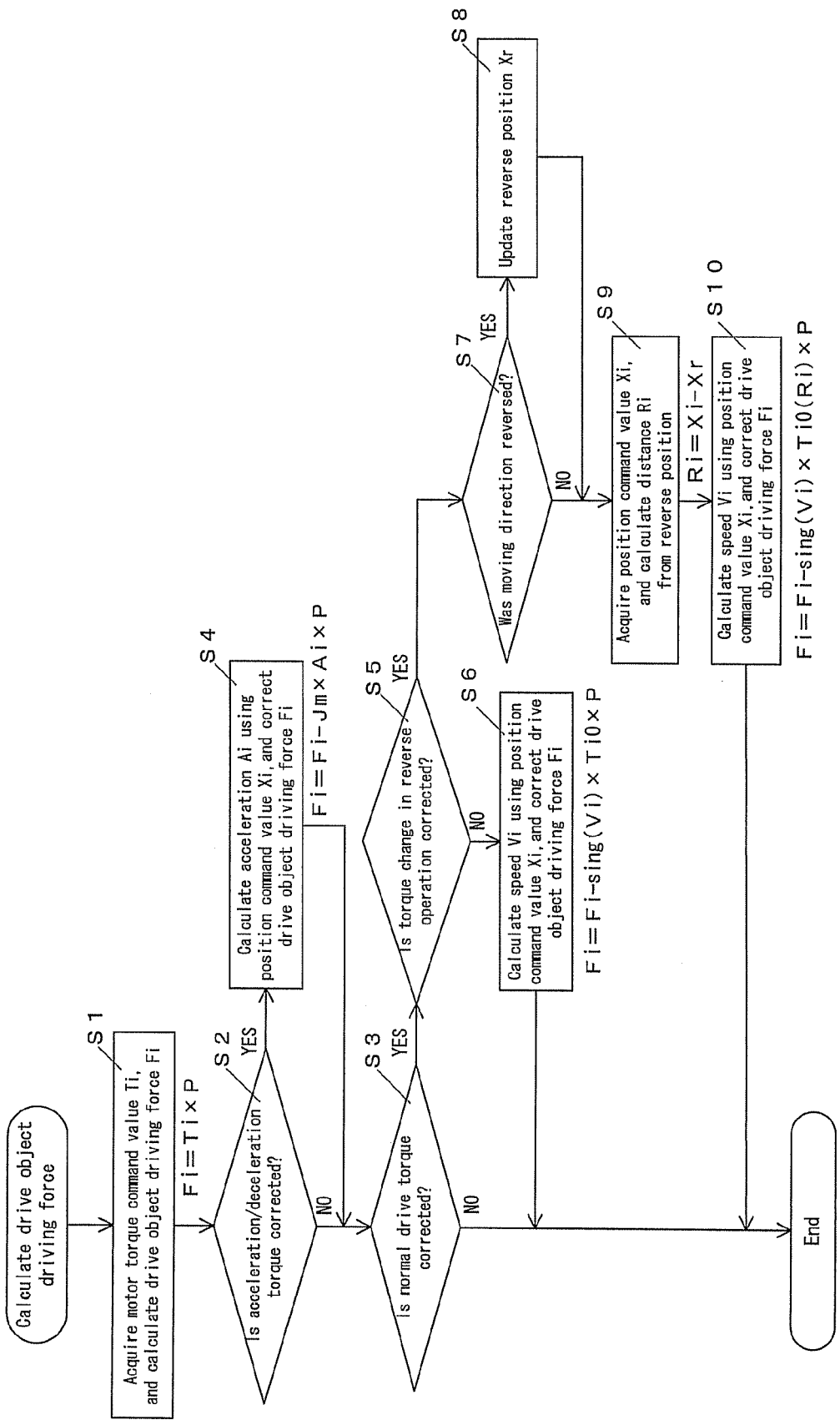
FIG. 2 is a flowchart of a drive object driving force.

In the machine diagnosing device 20 configured as described above, when the position control device 1 outputs the motor torque command value Ti from the speed control unit 12, the drive object driving force calculating unit 21 calculates the drive object driving force Fi as shown in a flowchart in FIG. 2. It should be noted that, in this embodiment, a torque thrust conversion coefficient P, a rotary body inertia Jm, and a normal rotary body rotating torque Ti0 are previously stored as initial values.

Firstly, in S1, the drive object driving force calculating unit 21 calculates the drive object driving force Fi by multiplying the acquired motor torque command value Ti by the torque thrust conversion coefficient P. When an acceleration/deceleration torque is not corrected by the determination in S2 and a normal drive torque is not corrected by the determination in S3, the drive object driving force calculating unit 21 ends the routine and outputs the drive object driving force Fi to the elastic deformation error estimation calculating unit 23.

On the other hand, when the acceleration/deceleration torque is corrected by the determination in S2, the drive object driving force calculating unit 21 calculates an acceleration Ai using a position command value Xi and corrects the drive object driving force Fi by the following Formula 1 in S4.

$$Fi=Fi-Jm \times Ai \times P \qquad \text{Formula 1}$$

Further, when the normal drive torque is corrected by the determination in S3, the drive object driving force calculating unit 21 determines whether a torque change in a reverse operation is corrected in S5. When the torque is not corrected, the drive object driving force calculating unit 21 calculates a speed Vi using the position command value Xi and corrects the drive object driving force Fi by a following Formula 2 in S6.

$$Fi=Fi-\operatorname{sing}(Vi) \times Ti0 \times P \qquad \text{Formula 2}$$

On the other hand, when a torque change in a reverse operation is corrected by the determination in S5, the drive object driving force calculating unit 21 determines whether a moving direction is reversed in S7. When the moving direction is not reversed, the process proceeds to S9. When the moving direction is reversed, the drive object driving force calculating unit 21 updates a reverse position Xr in S8 and the process proceeds to S9. In S9, the drive object driving force calculating unit 21 calculates a distance Ri using the reverse by a following Formula 3 using the position command value Xi and the reverse position Xr.

$$Ri=Xi-Xr \qquad \text{Formula 3}$$

Further, the drive object driving force calculating unit 21 calculates the speed Vi using the position command value Xi and corrects the drive object driving force Fi by a following Formula 4 in S10.

$$Fi=Fi-\operatorname{sing}(Vi) \times Ti0(Ri) \times P \qquad \text{Formula 4}$$

When the acquired drive object driving force Fi is inputted into the elastic deformation error estimation calculating unit 23, the elastic deformation error estimation calculating unit 23 calculates the elastic deformation error Ei using the drive object driving force Fi and the spring constant K of the ball screw 4 as described above, and outputs Ei to the machine damage diagnosing unit 24.

On the other hand, the positional deviation calculating unit 22 calculates the positional deviation Di using the rotation position Zi of the servo motor 3 and the position Yi of the table 2, and outputs Di to the machine damage diagnosing unit 24. Therefore, the machine damage diagnosing unit 24 calculates a machine damage coefficient $\eta$ using the elastic deformation error Ei and the positional deviation Di and compares the machine damage coefficient $\eta$ with a threshold value $\eta 0$. When the machine damage coefficient $\eta$ exceeds the threshold value $\eta 0$, the machine damage diagnosing unit 24 displays it on an operation screen so as to notify the worsen damage. In this case, it is also possible to notify a machine administrator or a machine manufacturing company of the worsen damage by using a communication means.

According to the machine diagnosing method of the embodiment 1 and its device, by a rational use of the first and second position detectors which are included in a full closed loop position control machine, the method enables to diagnose a damage state with higher reliability than that of a conventional method. Therefore, an abnormal part or duration of life can be detected in advance, and can be notified to a user.

Although a damaging extent is diagnosed by comparing the machine damage coefficient η with a single threshold value η0 in the embodiment 1, a damaging extent can be notified in a phased manner by being provided a plurality of threshold values.

Further, when a diagnosis is performed using a moment difference in the positional deviation calculating unit 22, the diagnosis may be unstable. To avoid the unstable diagnosis, the diagnosis can be performed by storing of a difference within a previously determined period in a storing unit (not illustrated) to calculate an average value, and comparing the average value with a threshold value. Further, the diagnosis can be also performed by calculating a ratio of an acquired value and the threshold value to make the ratio to be a diagnosis parameter, integrating the diagnosis parameter or using a separately set function so as to acquire a value. The acquired value can be used as a machine element of duration of life counter. In this case, when the value of the machine element life duration counter exceeds a separately set life duration counter threshold value, it is determined that the life duration has expired.

Furthermore, a spring constant Kn can be calculated using the drive object driving force Fi and the positional deviation Di. Thus, a damage state of the device can be diagnosed by comparing the calculated spring constant Kn and a constant K0 peculiar to the device.

Embodiment 2

Then, another embodiment of the present invention will be described. It should be noted that same constitutional parts as those in the embodiment 1, such as a position control device of a table, are used with the same reference numerals and the descriptions of the same constitutional parts are omitted.

Figure 3:
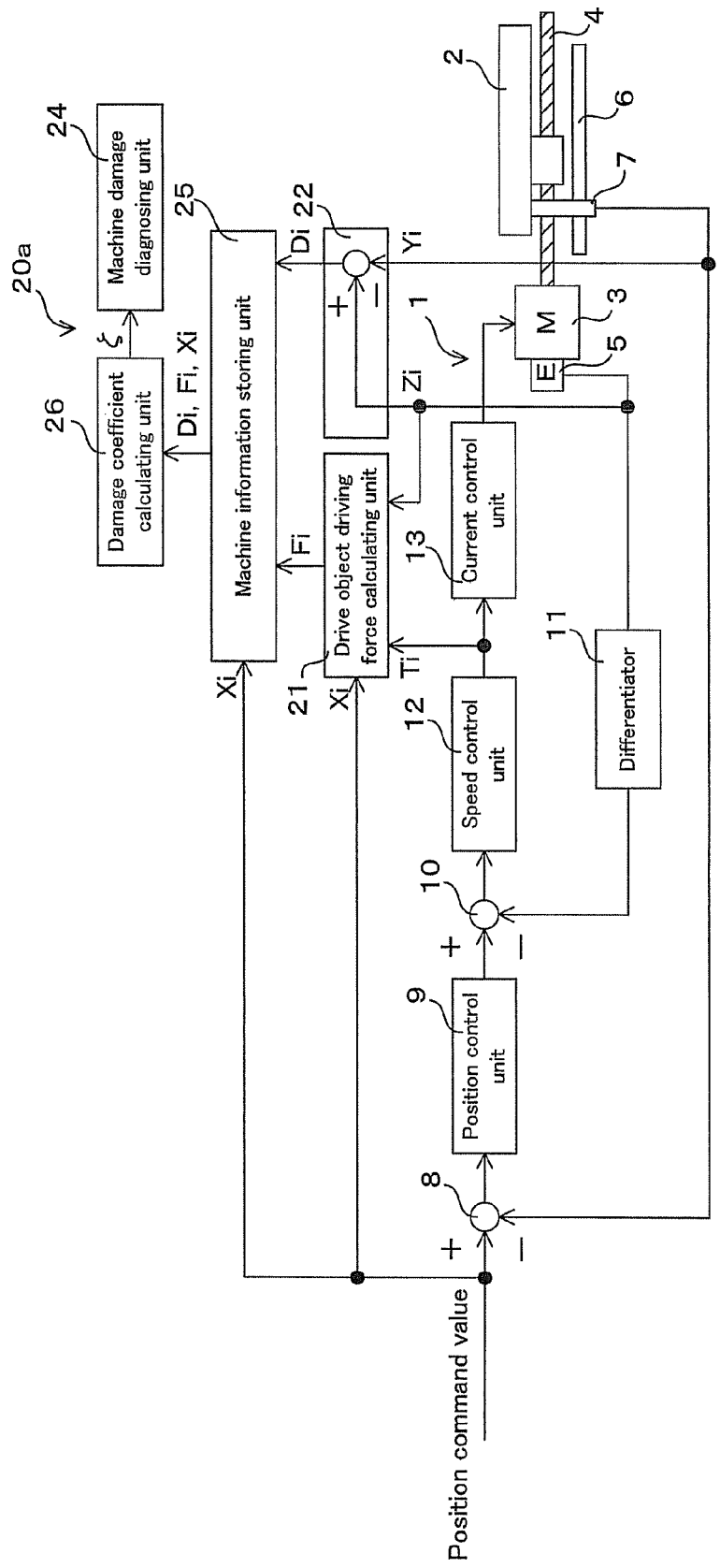
FIG. 3 is a constitutional block diagram of a machine diagnosing device of a second embodiment.

In a machine diagnosing device 20a illustrated in FIG. 3, a drive object driving force Fi acquired by a drive object driving force calculating unit 21 and a positional deviation Di acquired by a positional deviation calculating unit 22 are inputted into a machine information storing unit 25 with a position command value Xi. The machine information storing unit 25 performs machine information storing processing described below and stores each value. Then, a damage coefficient calculating unit 26 calculates a machine damage coefficient ζ by a routine described below based on the stored drive object driving force Fi, positional deviation Di, and a position command value Xi. A machine damage diagnosing unit 24 diagnoses a damage state based on the machine damage coefficient ζ.

Figure 4:
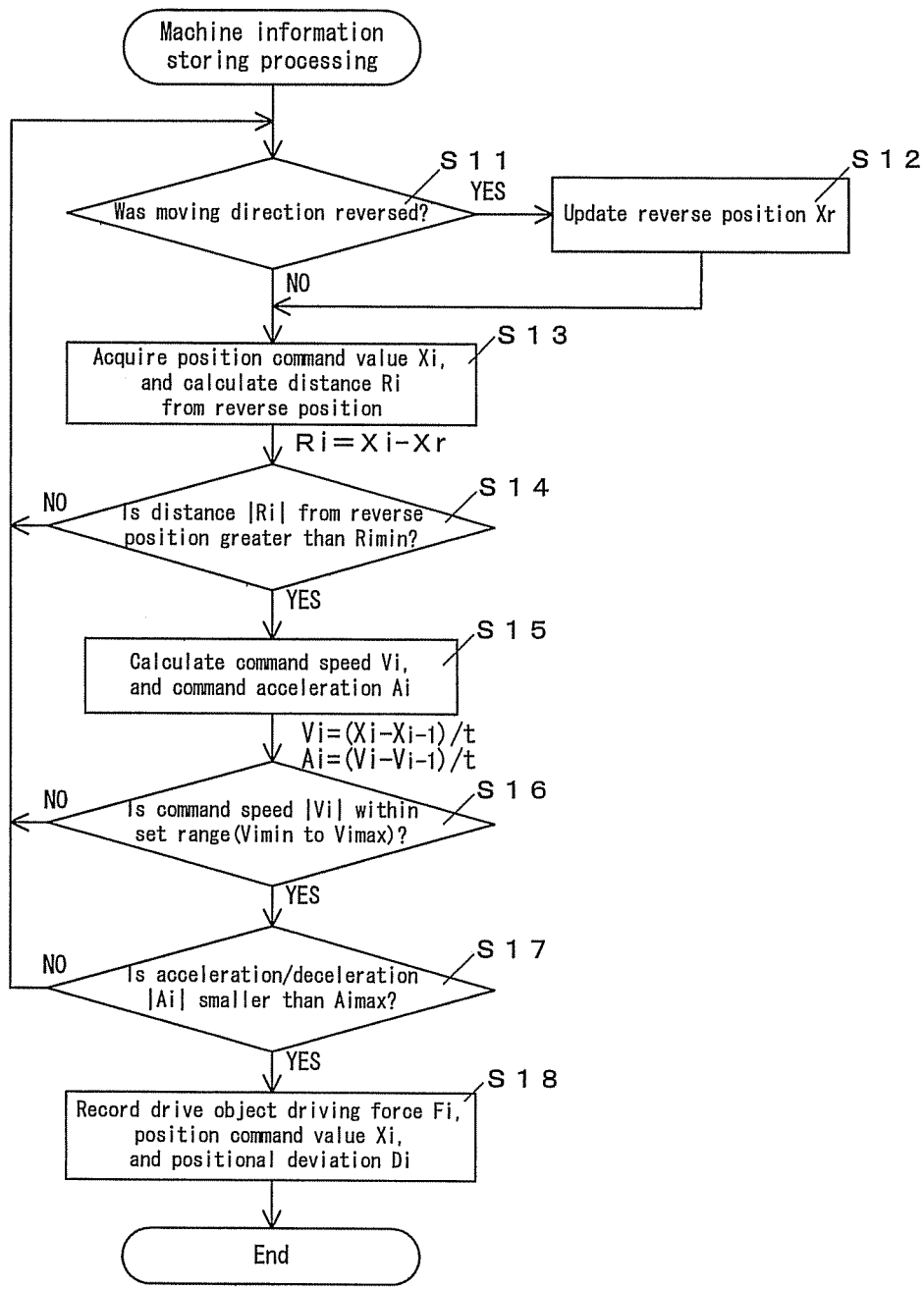
FIG. 4 is a flowchart of machine information storing processing.

The machine information storing processing in the machine information storing unit 25 is conducted as shown in a flowchart in FIG. 4. It should be noted that, in this embodiment, a minimum value of a reversal distance Rimin, a minimum value of a command speed Vimin, a maximum value of a command speed Vimax, and a maximum value of an acceleration speed Aimax are given as initial-setting values.

In S11, the machine information storing unit 25 determines whether a moving direction is reversed. When the moving direction is reversed, the machine information storing unit 25 updates a reverse position Xr in S12 and acquires a current position Xi in S13. When the moving direction is not reversed, the machine information storing unit 25 does not update the reverse position in S12 and directly acquires the current position Xi in S13. Then, the machine information storing unit 25 calculates a distance Ri using the reverse position by the difference between Xi and Xr.

Then, in S14, the machine information storing unit 25 determines whether the absolute value |Ri| of the calculated distance Ri is greater than Rimin. When the absolute value |Ri| is smaller than Rimin, the process returns to S11 without performing the storing processing. When the absolute value |Ri| is greater than Rimin, the machine information storing unit 25 calculates a command speed Vi and a command acceleration Ai based on the following Formulas 5 and 6 in S15.

$$Vi=(Xi-X_{i-1})/t \qquad \text{Formula 5}$$

$$Ai=(Vi-V_{i-1})/t \qquad \text{Formula 6}$$

Similarly, the machine information storing unit 25 determines whether the absolute value |Vi| of the command speed is within the set range (from Vimin to Vimax) in S16 and determines whether an absolute value |Ai| of an acceleration/deceleration speed is smaller than Aimax in S17. When these values are not within these ranges, the machine information storing unit 25 does not perform the storing processing and the process returns to S11.

Further, when the absolute value |Vi| of the command speed is within the set range (from Vimin to Vimax) and the absolute value |Ai| of the acceleration speed is smaller than Aimax, the machine information storing unit 25 stores the drive object driving force Fi, the position command value Xi, and the positional deviation Di in S18.

As described above, the machine information storing unit 25 determines a distance from the reverse position in the driving direction, speed, and acceleration/deceleration speed under each predetermined condition (S14, S16, S17). When the determined results do not satisfy each condition, the machine information storing unit 25 does not perform the storing processing. The reason of this processing is that machine information may be varied at the time of a reverse or a high speed movement.

The damage coefficient calculating unit 26 calculates a machine damage coefficient ξ by formula of ξ=(Fi/Di), ξ=(Fi/Di)/K0 (K0 is a spring constant peculiar to a device), or ξ=(Fi/Di−K0)/K0, based on the stored drive object driving force Fi, the position command value Xi, and the positional deviation Di. Then, the machine damage diagnosing unit 24 compares the acquired machine damage coefficient ξ with a threshold value ξ0, and diagnoses the damaging state of the machine.

According to the machine diagnosing method of the embodiment 2 and a device therefor, by rationally using the first and second position detectors which are included in a full closed loop position control machine, the machine diagnosing method enables to diagnose a damage state with higher reliability than that of a conventional method. Therefore, in this method, an abnormal part or duration of life can be detected and notified to a user in advance. Particularly, the predetermined conditions are respectively set to machine information such as a distance from the reverse position at the time of reversing the moving direction of the table 2, a speed, and an acceleration speed. When the machine information does not satisfy each condition, the machine information storing unit 25 does not store the machine information. This enables to acquire proper machine information and to perform a calculation of machine damage coefficient with high accuracy, and thus contributes to a precise diagnosis.

Embodiment 3

Figure 5:
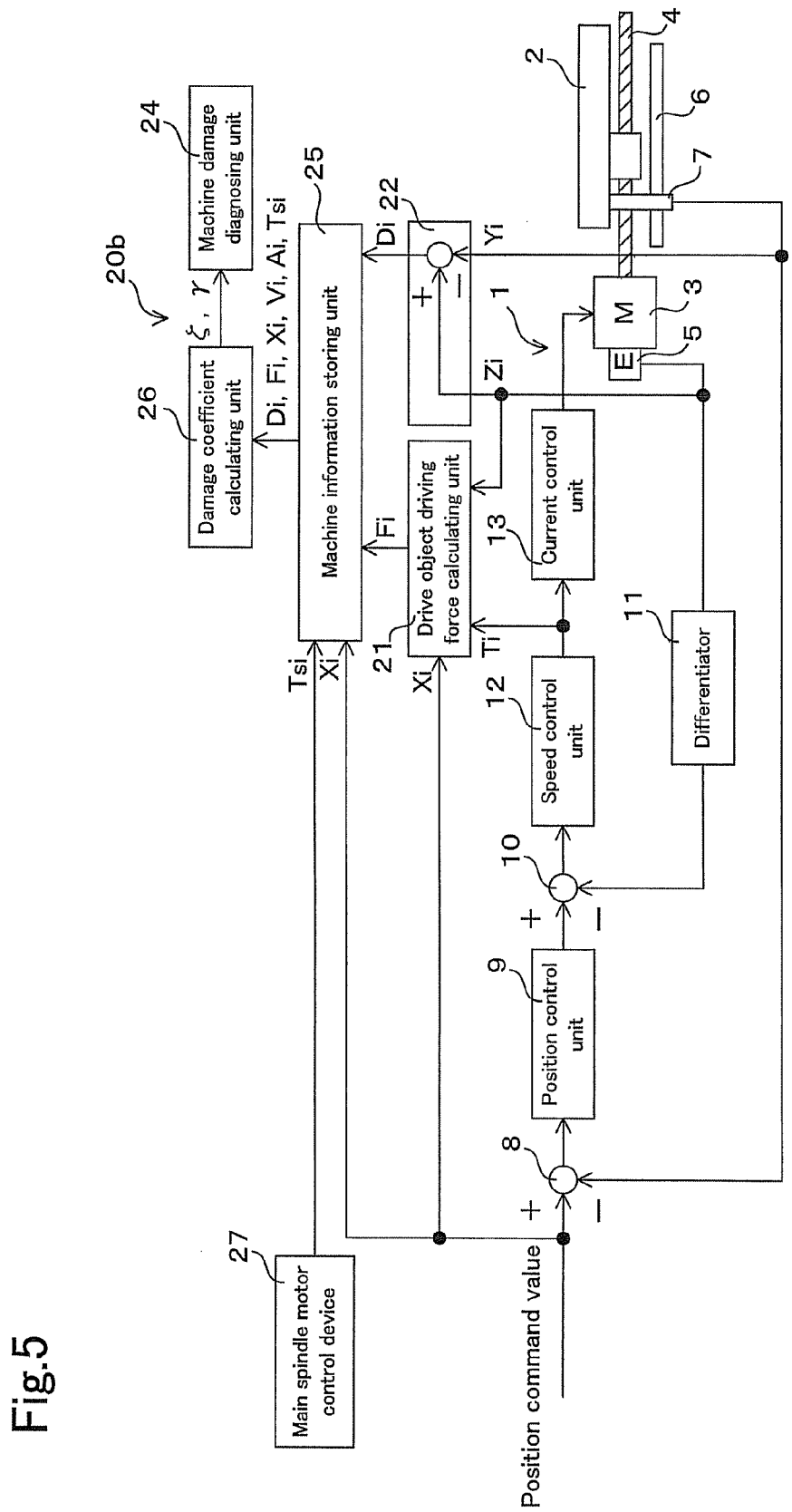
FIG. 5 is a constitutional block diagram of a machine diagnosing device of a third embodiment.
Figure 6:
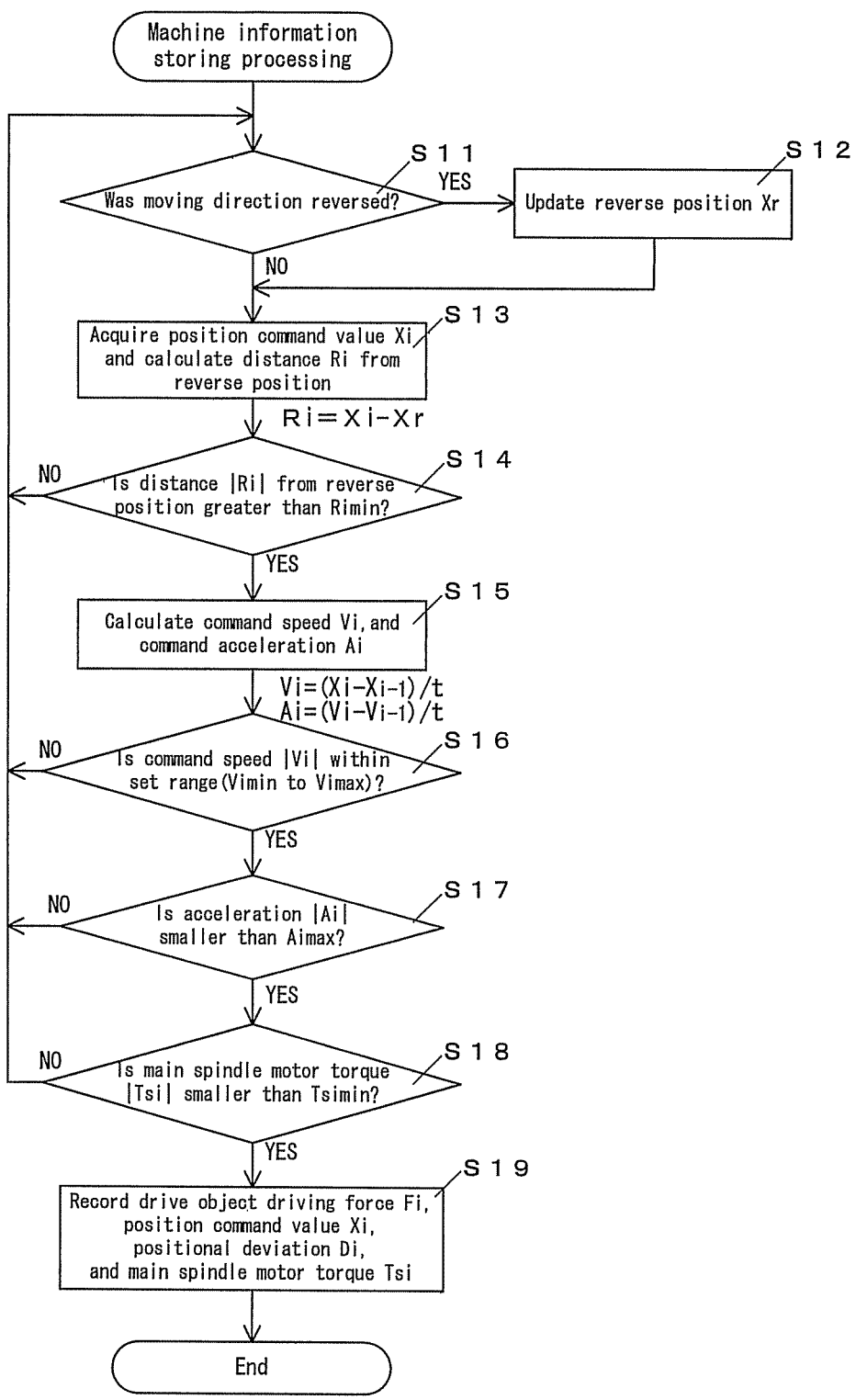
FIG. 6 is a flowchart of machine information storing processing.

As compared with the embodiment 2 illustrated in FIG. 3, a machine diagnosing device 20b illustrated in FIG. 5 is different in a point that a main spindle motor torque Tsi is inputted into a machine information storing unit 25 from a main spindle motor control device 27 of a machine tool. Thus, in machine information storing processing by the machine information storing unit 25, as shown in FIG. 6, the machine information storing unit 25 further determines whether an absolute value |Tsi| of a mains spindle motor torque is smaller than Tsmin in S18, where Tsmin is a minimum value of the main spindle motor torque previously set as an initial-setting value. When the absolute value |Tsi| is greater than Tsmin, the machine information storing unit 25 does not perform the storing processing. Only when the absolute value |Tsi| is smaller than Tsmin, the machine information storing unit 25 stores a drive object driving force Fi, a position command value Xi, a positional deviation Di, and a main spindle motor torque Tsi, respectively, in S19. In other words, in addition to the three conditions according to the embodiment 2, i.e., conditions at a time of a reverse in a drive direction, at a time of an acceleration/deceleration, and at a time of a high speed movement, another condition where a machining force is large may also cause variability among the acquired machine information. Thus, when the machining force does not satisfy this condition, the machine information storing unit 25 is made to avoid storing the machine information.

Figure 7:
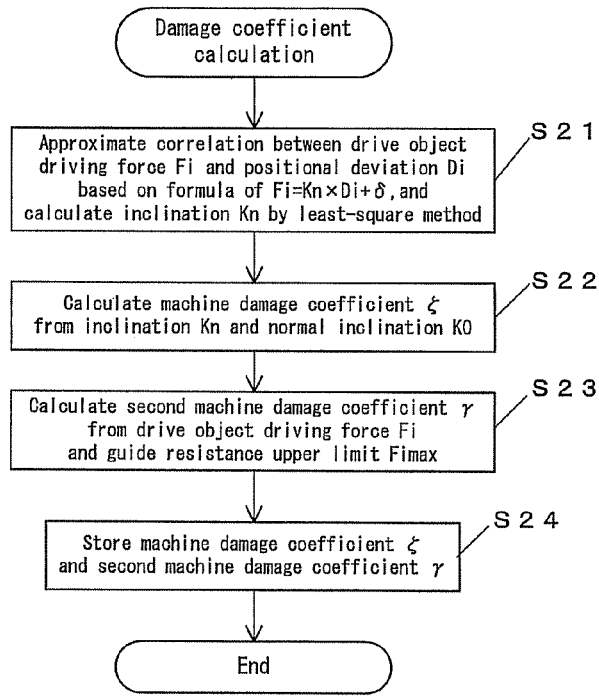
FIG. 7 is a flowchart of a machine damage coefficient calculation.

Further, in this embodiment, a calculation of a machine damage coefficient in a damage coefficient calculating unit 26 is performed according to a flowchart illustrated in FIG. 7.

In S21, the damage coefficient calculating unit 26 approximates a correlation between a drive object driving force Fi and a positional deviation Di which are stored in the machine information storing unit 25 in a time-series manner based on a following Formula 7, and calculates an inclination Kn and an offset δ by a least-square method.

$$Fi = Kn \times Di + \delta \qquad \text{Formula 7}$$

Then, in S22, the damage coefficient calculating unit 26 calculates a machine damage coefficient ζ based on the calculated inclination Kn and a normal inclination K0 previously set as an initial-setting value. This calculation can be performed by a formula of ζ=(Kn−K0)/K0 or ζ=Kn/K0.

In S23, the damage coefficient calculating unit 26 calculates a second machine damage coefficient γ based on a drive object driving force Fi and a guide resistance upper limit Fimax previously set as an initial-setting value. The calculation of the second machine damage coefficient γ can be performed by a formula of γ=Fi/Fimax or γ=(Fi−Fimax)/Fimax. Further, the probability that a ratio of the drive object driving force Fi to the guide resistance upper limit Fimax does not satisfy a previously set condition (for example, the ratio is not greater than a set constant C, that is, the ratio becomes Fi/Fimax>C in this probability) can be made to be the second machine damage coefficient γ. Thereby, a sign of abnormality can be spotted by an increase of the probability, and the machine diagnosing method enables to diagnose before a serious problem occurs.

Finally, in S24, the damage coefficient calculating unit 26 stores the machine damage coefficient ζ and the second machine damage coefficient γ, respectively, and ends the processing.

Figure 8:
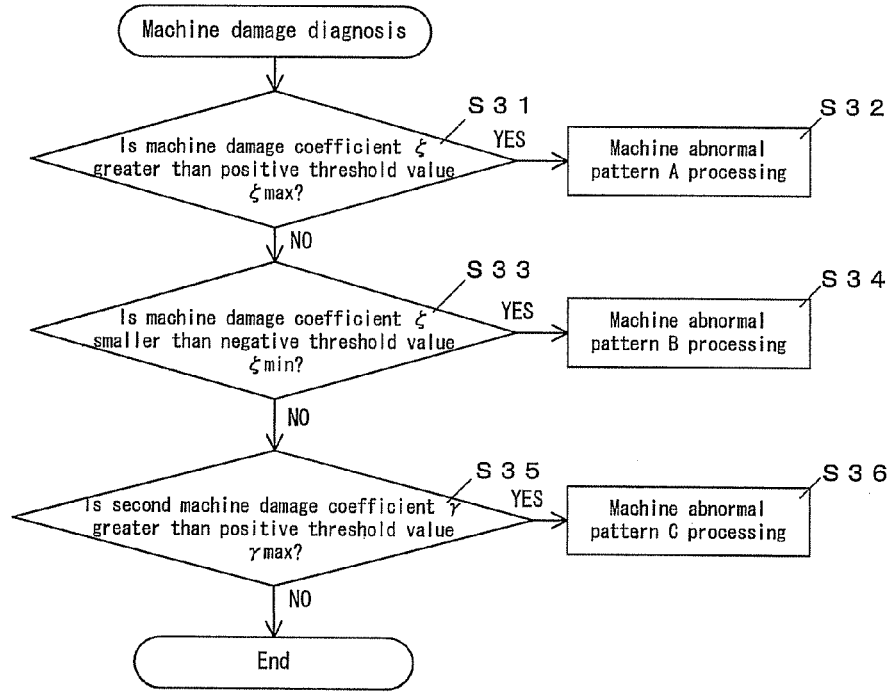
FIG. 8 is a flowchart of a machine damage diagnosis.

Further, a machine diagnosing in the machine damage diagnosing unit 24 is performed as shown in a flowchart illustrated in FIG. 8.

In this case, a positive threshold value ζmax, a negative threshold value ζmin, and a threshold value γmax are previously set as initial-setting values. Firstly, in S31, the machine damage diagnosing unit 24 determines whether the machine damage coefficient ζ is greater than the positive threshold value ζmax. When the machine damage coefficient ζ is greater than the positive threshold value ζmax, the machine damage diagnosing unit 24 determines that a damage degree is worsened due to an increase of the rotation resistance of a bearing or a nut, and conducts a machine abnormal pattern A for notifying the content in S32.

On the other hand, when the machine damage coefficient ζ is smaller than the positive threshold value ζmax in the determination of S31, the machine damage diagnosing unit 24 determines whether the machine damage coefficient ζ is smaller than the negative threshold value ζmin in S33. When the machine damage coefficient ζ is smaller than the negative threshold value ζmin, the machine damage diagnosing unit 24 determines that an abrasion of a bearing or a nut worsens, and conducts a machine abnormal pattern B for notifying the content in S34.

As described above, the large and small threshold values ζmax and ζmin are set to be compared with the machine damage coefficient ζ. The reason of this is as follows. When a bearing of a motor or the like is damaged, the calculated drive object driving force Fi is to be greater than that at the time of a normal driving, and thus ζ is to be great. On the other hand, when a ball screw nut or the like is loosened due to abrasion, the positional deviation Di is to be greater than that at the time of normal driving, and thus ζ is to be small. Therefore, by comparing the machine damage coefficient ζ with two threshold values, the abnormality can be diagnosed by a cause.

Further, when the machine damage coefficient ζ is greater than the negative threshold value ζmin in the determination of S33, the machine damage diagnosing unit 24 determines whether the second machine damage coefficient γ is greater than the threshold value γmax in S35. When the second machine damage coefficient γ is greater than the threshold value γmax, the machine damage diagnosing unit 24 determines that guide resistance is increased, and conducts a machine abnormal pattern C for notifying the content. When the machine damage coefficient ζ does not have abnormality and the second machine damage coefficient γ has abnormality, the machine damage diagnosing unit 24 determines that the guide part has abnormality.

According to the machine diagnosing method of the embodiment 3 and a device therefor, a damage state can be diagnosed with remarkably higher reliability than that of a conventional method. Further, the method enables to detect an abnormal part or duration of life in advance, and to notify it to a user. Particularly, the predetermined conditions are respectively set to a reverse distance at a time of reversing in a moving direction of the table 2, a speed, an acceleration/deceleration speed, and a main spindle motor torque. When each predetermined condition is not satisfied, the machine information storing unit 25 does not store the machine information. Therefore, proper machine information can be acquired, which enables to calculate a machine damage coefficient with high accuracy, and thus a precise diagnosis can be performed.

Further, the machine information storing unit 25 stores a plurality of drive object driving forces and positional deviations in a time-series manner. The damage coefficient calculating unit 26 approximates a correlation between the plurality of stored drive object driving forces and stored positional deviations to a line to acquire an inclination of the line, and calculates the machine damage coefficient ζ using the acquired inclination and a previously set inclination at a normal time. Therefore, a machine damage coefficient can be calculated more accurately based on the plurality of drive object driving forces and positional deviations.

Further, the damage coefficient calculating unit 26 calculates the second machine damage coefficient γ using the drive object driving force and the guide resistant upper limit. When an abnormality is not diagnosed in the comparison between the machine damage coefficient ζ and the threshold value, the machine damage diagnosing unit 24 compares the second machine damage coefficient γ and the threshold value to diagnose a damage state. Therefore, the abnormality of the guide part can be diagnosed, and thus the reliability of machine diagnosing can be improved.

Further, the machine damage diagnosing unit 24 sets a lower limit and an upper limit as a threshold value of the machine damage coefficient ζ. When the machine damage coefficient ζ is not within the range from the lower limit to the upper limit, the machine damage is diagnosed. Therefore, the abnormal part can be specified, and a treatment after diagnosing, such as maintenance or the like, can be performed easily.

It should be noted that, in the embodiment 3, when the afore-said inclination is calculated by a least-square method, an approximation error Sn can be calculated to evaluate the reliability of the acquired machine damage coefficient ζ. For example, when data has much dispersion, that is, when the approximation error Sn is great, the reliability of a diagnosis may be low. In such a case, the processing is performed without conducting a diagnosis. On the other hand, when the high approximation error Sn is continued, the diagnosing method determines that the damage of a machine is worsened. Therefore, a damage state of a machine can be diagnosed by setting a threshold value with a size of the approximation error Sn.

Further, an operation range of a drive object can be divided into a plurality of sections to calculate the machine damage coefficient ζ in each divided section. A value acquired by dividing the afore-said offset δ by the inclination Kn indicates offsets of the first position detector and the second position detector, and is an error generated by thermal expansion of a ball screw or the like. The error due to thermal expansion is changed due to the position of the ball screw. Thus, the operation range is divided into a plurality of sections, and a diagnosis is performed in each section. However, since the error due to thermal expansion is changed with time, it is necessary to note an expiration date for use of the past data stored in the machine information storing unit. Therefore, when the error is influenced by a thermal displacement, it is desired that a calculation usable period is set previously.

On the other hand, in the machine information storing processing in the embodiments 2 and 3, a specified condition is previously set to a distance at a time of reversing, speed, and the like respectively and the storing processing is performed when all conditions are satisfied. However, in addition this, when at least one condition is satisfied, the storing processing can be carried out.

Further, in all of the embodiments, the position command value Xi is used in a calculation of a drive object driving force and in a process of a machine information storing processing. Instead of the position command value Xi used in these processes, an output Zi of the first position detector and an output Yi of the second position detector can be used. Further, the drive object driving force can be calculated based on not only the plurality of machine information but also only a motor torque command value.

In addition, the present invention is not limited to a position control device of a table of a machine tool. The present invention can be applied to other drive objects such as a main spindle head and the like, and can be applied to other industrial machines such as a carrier robot and the like.

What is claimed is:

1. A machine diagnosing method for diagnosing a machine damage in a full closed loop position control machine, wherein the full closed loop position control machine comprises a first position detector for detecting a rotation position of a motor, and a second position detector for directly detecting a position of a drive object driven by the motor, and wherein the full closed loop position control machine controls the position of the drive object based on an inputted position command value, a rotation position of the motor acquired with the first position detector, and a position of the drive object acquired with the second position detector, the machine diagnosing method comprising:
   a drive object driving force estimating step for estimating a drive force that drives a drive object, based on at least a torque command value to the motor acquired using the position command value, being multiplied by a torque thrust conversion coefficient;
   an elastic deformation error estimating step for estimating an elastic deformation error of the drive object with the drive object driving force and a spring constant of the drive object;
   a positional deviation calculating step for calculating a positional deviation between a rotation position of the motor detected by the first position detector and a position of the drive object detected by the second position detector; and
   a machine damage diagnosing step for diagnosing a machine damage state of the drive object by calculating a machine damage coefficient using a difference between the elastic deformation error of the drive object and the positional deviation, comparing the acquired machine damage coefficient with a previously set threshold value, and diagnosing the machine damage state of the drive object based on a result of the comparison.

2. A machine diagnosing device for diagnosing a machine damage in a full closed loop position control machine, wherein the full closed loop position control machine comprises a first position detector for detecting a rotation position of a motor, and a second position detector for directly detecting a position of a drive object driven by the motor, and wherein the full closed loop position control machine controls the position of the drive object based on an inputted position command value, a rotation position of the motor acquired with the first position detector, and a position of the drive object acquired with the second position detector, the machine diagnosing device comprising:
   a drive object driving force estimating unit for estimating a drive force that drives a drive object, based on at least a torque command value to the motor acquired using the position command value, being multiplied by a torque thrust conversion coefficient;
   an elastic deformation error estimating unit for estimating an elastic deformation error of the drive object with the drive object driving force and a spring constant of the drive object;
   a positional deviation calculating unit for calculating a positional deviation between the rotation position of the motor detected by the first position detector and the position of the drive object detected by the second position detector; and
   a machine damage diagnosing unit for diagnosing a machine damage state of the drive object by calculating a machine damage coefficient using a difference between the elastic deformation error of the drive object and the positional deviation, comparing the acquired machine damage coefficient with a previously set threshold value, and diagnosing the machine damage state of the drive object based on a result of the comparison.

3. A machine diagnosing device for diagnosing a machine damage in a full closed loop position control machine, wherein the full closed loop position control machine comprises a first position detector for detecting a rotation position of a motor, and a second position detector for directly detecting a position of a drive object driven by the motor, and wherein the full closed loop position control machine controls a position of the drive object based on an inputted position command value, a rotation position of the motor acquired with the first position detector, and the position of the drive object acquired with the second position detector, the machine diagnosing device comprising:

a drive object driving force estimating unit for estimating a drive force that drives a drive object based on at least a torque command value to the motor acquired using a position command value being multiplied by a torque thrust conversion coefficient;

a positional deviation calculating unit for calculating a positional deviation between a rotation position of the motor detected by the first position detector and a position of the drive object detected by the second position detector;

a machine information storing unit for storing the drive object driving force of the drive object the positional deviation and an inherent spring constant of the machine;

a damage coefficient calculating unit for calculating a machine damage coefficient based on the drive object driving force of the drive object the positional deviation stored in the machine information storing unit and an inherent spring constant of the machine;

a machine damage diagnosing unit for diagnosing a machine damage state of the drive object by comparing the obtained machine damage coefficient with a previously set threshold value and diagnosing the machine damage state of the driving object based on a result of the comparison;

wherein the machine information storing unit stores a plurality of drive object driving forces and positional deviations in a time-series manner; and wherein the damage coefficient calculating unit approximates a correlation between the plurality of the drive object driving forces and the positional deviations stored in the machine information storing unit to a line, acquires an inclination of the line, and calculates the machine damage coefficient using the inclination and a previously set inclination at a normal time.

4. The machine diagnosing device according to claim 3, wherein the damage coefficient calculating unit calculates a second machine damage coefficient using the drive object driving force and a previously set guide resistance upper limit of a guide part of the drive object; and wherein when the machine damage diagnosing unit does not diagnose abnormally by comparing the machine damage coefficient and the threshold value, the machine damage diagnosing unit compares the second machine damage coefficient with a previously set threshold value so as to diagnose a damage state of the drive object.

5. The machine diagnosing device according to claim 4, wherein the second machine damage coefficient is made to be a probability in which a ratio of the drive object driving force and the guide resistant upper limit does not satisfy a set condition.

6. The machine diagnosing device according to claim 3 wherein the machine damage diagnosing unit sets a lower limit and an upper limit as the threshold value of the machine damage coefficient, and diagnoses abnormality upon the machine damage coefficient being not within a range from the lower limit to the upper limit.

7. A machine diagnosing device for diagnosing a machine damage in a full closed loop position control machine, wherein the full closed loop position control machine comprises a first position detector for detecting a rotation position of a motor, and a second position detector for directly detecting a position of a drive object driven by the motor, and wherein the full closed loop position control machine controls a position of the drive object based on an inputted position command value, a rotation position of the motor acquired with the first position detector, and the position of the drive object acquired with the second position detector, the machine diagnosing device comprising:

a drive object driving force estimating unit for estimating a drive force that drives a drive object based on at least a torque command value to the motor acquired using a position command value being multiplied by a torque thrust conversion coefficient;

a positional deviation calculating unit for calculating a positional deviation between a rotation position of the motor detected by the first position detector and a position of the drive object detected by the second position detector;

a machine information storing unit for storing the drive object driving force of the drive object the positional deviation and an inherent spring constant of the machine;

a damage coefficient calculating unit for calculating a machine damage coefficient based on the drive object driving force of the drive object the positional deviation stored in the machine information storing unit and an inherent spring constant of the machine;

a machine damage diagnosing unit for diagnosing a machine damage state of the drive object by comparing the obtained machine damage coefficient with a previously set threshold value and diagnosing the machine damage state of the driving object based on a result of the comparison;

wherein when predetermined machine information at a time of reversing in a driving direction of the motor or the driving object does not satisfy a predetermined condition, the machine information storing unit does not store the machine information or the damage coefficient calculating unit removes the machine information from an operand;

wherein the machine information storing unit stores a plurality of drive object driving forces and positional deviations in a time-series manner; and wherein the damage coefficient calculating unit approximates a correlation between the plurality of the drive object driving forces and the positional deviations stored in the machine information storing unit to a line, acquires an inclination of the line, and calculates the machine damage coefficient using the inclination and a previously set inclination at a normal time.

8. The machine diagnosing device according to claim 7, wherein the damage coefficient calculating unit calculates a second machine damage coefficient using the drive object driving force and a previously set guide resistance upper limit of a guide part of the drive object; and wherein when the machine damage diagnosing unit does not diagnose abnormally by comparing the machine damage coefficient and the threshold value, the machine damage diagnosing unit compares the second machine damage coefficient with a previously set threshold value so as to diagnose a damage state of the drive object.

9. The machine diagnosing device according to claim 8, wherein the second machine damage coefficient is made to be a probability in which a ratio of the drive object driving force and the guide resistant upper limit does not satisfy a set condition.

10. A machine diagnosing device for diagnosing a machine damage in a full closed loop position control machine, wherein the full closed loop position control machine comprises a first position detector for detecting a rotation position of a motor, and a second position detector for directly detecting a position of a drive object driven by the motor, and wherein the full closed loop position control machine controls a position of the drive object based on an inputted position command value, a rotation position of the motor acquired with the first position detector, and the position of the drive object acquired with the second position detector, the machine diagnosing device comprising:
  a drive object driving force estimating unit for estimating a drive force that drives a drive object based on at least a torque command value to the motor acquired using a position command value being multiplied by a torque thrust conversion coefficient;
  a positional deviation calculating unit for calculating a positional deviation between a rotation position of the motor detected by the first position detector and a position of the drive object detected by the second position detector;
  a machine information storing unit for storing the drive object driving force of the drive object the positional deviation and an inherent spring constant of the machine;
  a damage coefficient calculating unit for calculating a machine damage coefficient based on the drive object driving force of the drive object the positional deviation stored in the machine information storing unit and an inherent spring constant of the machine;
  a machine damage diagnosing unit for diagnosing a machine damage state of the drive object by comparing the obtained machine damage coefficient with a previously set threshold value and diagnosing the machine damage state of the driving object based on a result of the comparison;
  wherein the damage coefficient calculating unit calculates a second machine damage coefficient using the drive object driving force and a previously set guide resistance upper limit of a guide part of the drive object;
  wherein when the machine damage diagnosing unit does not diagnose abnormally by comparing the machine damage coefficient and the threshold value, the machine damage diagnosing unit compares the second machine damage coefficient with a previously set threshold value so as to diagnose a damage state of the drive object; and
  wherein the second machine damage coefficient is made to be a probability in which a ratio of the drive object driving force and the guide resistant upper limit does not satisfy a set condition.

11. The machine diagnosing device according to claim 10, wherein the machine damage diagnosing unit sets a lower limit and an upper limit as the threshold value of the machine damage coefficient, and diagnoses abnormality upon the machine damage coefficient being not within a range from the lower limit to the upper limit.

12. A machine diagnosing device for diagnosing a machine damage in a full closed loop position control machine, wherein the full closed loop position control machine comprises a first position detector for detecting a rotation position of a motor, and a second position detector for directly detecting a position of a drive object driven by the motor, and wherein the full closed loop position control machine controls a position of the drive object based on an inputted position command value, a rotation position of the motor acquired with the first position detector, and the position of the drive object acquired with the second position detector, the machine diagnosing device comprising:
  a drive object driving force estimating unit for estimating a drive force that drives a drive object based on at least a torque command value to the motor acquired using a position command value being multiplied by a torque thrust conversion coefficient;
  a positional deviation calculating unit for calculating a positional deviation between a rotation position of the motor detected by the first position detector and a position of the drive object detected by the second position detector;
  a machine information storing unit for storing the drive object driving force of the drive object the positional deviation and an inherent spring constant of the machine;
  a damage coefficient calculating unit for calculating a machine damage coefficient based on the drive object driving force of the drive object the positional deviation stored in the machine information storing unit and an inherent spring constant of the machine;
  a machine damage diagnosing unit for diagnosing a machine damage state of the drive object by comparing the obtained machine damage coefficient with a previously set threshold value and diagnosing the machine damage state of the driving object based on a result of the comparison;
  wherein when predetermined machine information at a time of reversing in a driving direction of the motor or the driving object does not satisfy a predetermined condition, the machine information storing unit does not store the machine information or the damage coefficient calculating unit removes the machine information from an operand;
  wherein the damage coefficient calculating unit calculates a second machine damage coefficient using the drive object driving force and a previously set guide resistance upper limit of a guide part of the drive object;
  wherein when the machine damage diagnosing unit does not diagnose abnormally by comparing the machine damage coefficient and the threshold value, the machine damage diagnosing unit compares the second machine damage coefficient with a previously set threshold value so as to diagnose a damage state of the drive object; and
  wherein the second machine damage coefficient is made to be a probability in which a ratio of the drive object driving force and the guide resistant upper limit does not satisfy a set condition.

* * * * *